Figures 1, 2, 3:
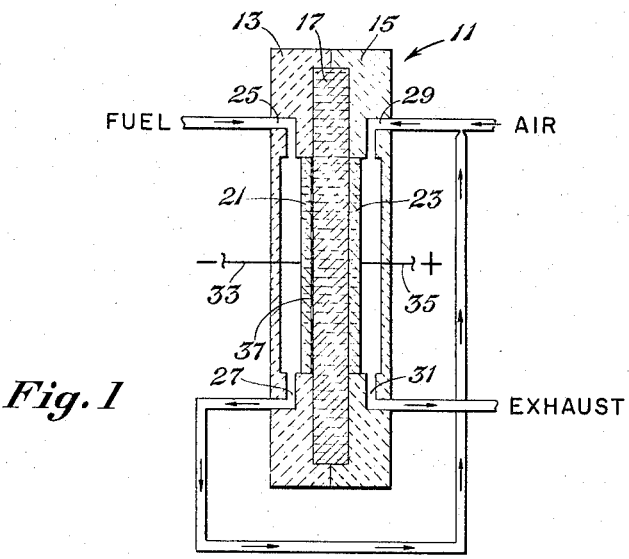

Feb. 6, 1968  K. W. KREISELMAIER  3,367,801
FUEL CELL INCLUDING ELECTRODE OF SILVER, NICKEL, AND ZINC
Filed Jan. 10, 1964

INVENTOR.
Kurt W. Kreiselmaier
BY William D. Harris, Jr.
Attorney

United States Patent Office 3,367,801
Patented Feb. 6, 1968

3,367,801
FUEL CELL INCLUDING ELECTRODE OF SILVER, NICKEL, AND ZINC

Kurt W. Kreiselmaier, Dallas, Tex., assignor to Texas Instruments Incorporated, Dallas, Tex., a corporation of Delaware
Filed Jan. 10, 1964, Ser. No. 336,934
4 Claims. (Cl. 136—86)

This invention relates to a porous electrode of silver, nickel and zinc, and to a method of making same.

In many applications, sintered electrodes are of considerable importance. This applies particularly to the electrodes in use in fuel cells, both when the electrolyte is carried by a matrix, such as a porous structure of magnesium oxide, and in those instances where a free electrolyte is employed. Moreover, in some instances, sintered electrodes of a porous structure have application in conventional batteries, for example, as an anode.

Various materials have been used in the past for sintered electrodes. One of these is substantially pure silver. It is an excellent electrode for some applications, for example, as an air electrode in fuel cells, but it does not in general make a good fuel electrode in a fuel cell system unless a catalyst is provided. The addition of catalyst in a manner to cause it to disperse evenly throughout the silver electrode material presents a problem.

Silver presents a problem for high temperature operation. It is rather mobile at 600° C., a common operating temperature for certain high temperature electrolytic fuel cells, for example, those employing a molten carbonate electrolyte. Thus, the silver tends to agglomerate and lose surface area over a period of time. Moreover, pure silver electrodes present an economic problem because of the high cost of silver.

Platinum can be sintered to provide an electrode; however, it is quite expensive and it tends to agglomerate at elevated temperatures. Other noble metals such as palladium and rhodium suffer from similar disadvantages.

Iron electrodes do not have good corrosion resistance in many systems, including molten carbonate electrolyte systems.

While nickel is a good electrode, with catalyst activity enabling it to serve in general as a fuel electrode, it must be sintered at elevated temperatures and under controlled conditions to obtain a satisfactory sintered electrode. Such processing is tedious and is expensive.

Accordingly, it is an object of this invention to provide a metal electrode having utility for fuel cell operation, and, in addition, for conventional battery-type operation, which is porous in character, which has high catalytic activity so it can serve as a fuel electrode as well as an oxidizer electrode, which does not tend to agglomerate at elevated temperatures, and which is durable, including resistance to corrosion, to give good performance over a sustained period of time. Moreover, it is an object of this invention to provide a method for making an electrode with the foregoing advantages.

An additional object of this invention is to provide such an electrode realizing the foregoing objects that has a porosity which can be simply controlled, within limits, by addition of "burn-out" constituent during the manufacture of the electrode.

It is yet an additional object of this invention to provide an electrode realizing the foregoing objects which has a high structural integrity and which will perform at elevated temperatures in molten electrolytic cells, specifically, in metallic carbonate fuel cells at elevated temperatures.

In order to accomplish these objects, this invention provides a porous electrode comprising a coherent matrix of commingled particles of silver, of nickel, and of zinc. The particles are sintered together in interconnecting structure comprising alloys of the zinc with the silver, and the zinc with the nickel.

A preferred embodiment of this invention provides a porous electrode comprising particles of silver, nickel, and zinc sintered into a coherent, porous matrix. A major proportion of the particles have a particle size no smaller than about 10 microns but no greater than about 150 mesh. The silver is present in an amount of no less than about 20 percent by weight, and no more than 90 percent by weight. The nickel is present in an amount of no less than about 5 percent by weight, and no more than about 60 percent by weight. The zinc is present in an amount of no less than about 5 percent by weight, and no more than about 15 percent by weight. The percentages of silver, nickel, and zinc are based on the total weight of silver, nickel, and zinc in the electrode. The particles are interconnected by alloy structure formed from the metals in the particles.

Moreover, a method is provided for making the electrode of this invention. The method comprises mixing discrete particles of silver, of nickel, and of zinc to obtain a particle mix; and thereafter heating the mix in an oxidation inhibiting environment at a sintering temperature until the particle mix sinters to unit into a porous, coherent mass.

A quite specific aspect of the process provided by this invention comprises first blending discrete particles of silver, of nickel, and of zinc to obtain a blended particle mix. The major portion of the particles blended have a particle size no larger than about 150 mesh and no smaller than about 10 microns. Silver particles are present in amount of at least about 10 percent by weight but no more than about 90 percent by weight. Nickel particles are present in amount of at least about 5 percent by weight but no more than about 60 percent by weight. Zinc particles are present in amount of at least about 5 percent by weight but no more than about 15 percent by weight. The weight percentages of the silver, nickel, and zinc particles are based on the total weight of silver, nickel, and zinc particles in the particle mix. Thereafter, the particle mix is supported in a desired shape and is heated to a temperature no lower than about 800° C. but no higher than about 900° C. in an inert environment for a period of time until said particle mix sinters into a porous, coherent mass of the desired shape.

FIGURE 1 is a transverse cross sectional view of a fuel cell in which electrodes in accordance with this invention may be utilized;

FIGURE 2 is a partial cross section, exaggerated in size, through a hypothetical electrode structure, which schematically illustrates certain aspects of the structure of the instant invention; and FIGURE 3 is a partial longitudinal cross section through a porous magnesium oxide disk with particles to be sintered into an electrode in accordance with the instant invention properly positioned on an upper face.

Referring now to FIGURE 1, therein a fuel cell is illustrated generally at 11. It is to be understood that fuel cell 11 is treated herein merely to show an application of the instant invention and that the fuel cell 11 in itself does not include any part of this invention.

In FIGURE 1, fuel cell 11 has an outer casing made up of the two casing halves 13 and 15. Porous magnesium oxide disk 17 is centrally enclosed between the casing halves 13 and 15. It is permeated with a sodium-lithium carbonate eutectic mixture in molten state, the cell being maintained at a temperature above the melting point of the sodium-lithium carbonate. One electrode is provided by a porous sintered electrode 21, which joins an outer face of the disk 17, and the other by a porous sintered electrode 23 which joins the opposite side of said disk.

Fuel inlet 25 and spent fuel outlet 27 are provided in casing half 13, and air inlet 29 and exhaust passage 31 are provided in casing half 15. Suitable wires 33 and 35 are conductively joined with the electrodes 21 and 23, and pass through the casing halves 13 and 15, respectively, to connect with an external circuit. In operation, a fuel gas containing a substantial quantity of hydrogen, for example, a pure stream of hydrogen, is fed into the fuel cell of FIGURE 1 through inlet 25, wherein it passes adjacent and partially permeates pore structure of the electrode 21. Spent fuel gas thereafter passes out of the cell through conduit 27 to join air being fed into the fuel cell 11, through air inlet 29. The spent fuel provides carbon dioxide for the air electrode (electrode 23). The air and spent fuel mixture pass adjacent and partially permeate pore structure of electrode 23. The exhaust from electrode 23 discharges through exhaust passage 31. The sintered electrodes 21 and 23 provide interfaces between the fuel and electrolyte, and the air-carbon dioxide mixture and electrolyte, respectively, which function as fuel and oxidizer electrodes in contact with the electrolyte of the cell.

The reaction at the fuel electrode (electrode 21) is as follows:

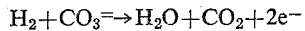
$$H_2 + CO_3^= \rightarrow H_2O + CO_2 + 2e^-$$

Note that fuel electrode 21 must provide the function of catalyzing the reaction, in addition to serving as an electrode.

The reaction at the air electrode is as follows:

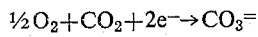
$$\tfrac{1}{2}O_2 + CO_2 + 2e^- \rightarrow CO_3^=$$

In practice, the operation of the fuel cell of FIGURE 1 is at a temperature in excess of about 500° C., for example, at about 600° C., in order to maintain the sodium-lithium carbonate eutectic in liquid state.

Attention is directed to the fuel electrode 21. Since a high catalytic activity is important at electrode 21, the instant invention finds a significant use functioning as such electrode 21. It should be noted that the electrode 21 adjoins a thin film 37 of material disposed on the surface of the magnesia disk 17 adjacent electrode 21. The thickness of this film is greatly exaggerated for purposes of pointing out its location. This thin film 37 is of silver. It is applied to the magnesium oxide disk by flame spray technique and is porous and/or discontinuous. The film provides a good bond between the magnesium oxide disk 17 and electrode 21.

Treating electrode 21 as a structure in accordance with the instant invention, this electrode will now be described. The body of the electrode 21 is shaped as a cylindrical disk. The electrode consists primarily of silver, zinc, and nickel. The silver is present in amount of no less than about 20 percent but no more than about 90 percent. The preferred range of silver is from about 30 percent to about 60 percent silver.

Zinc is contained in amount of from no less than about 5 percent to no more than about 15 percent.

Nickel is present in amount no less than about 5 percent and no more than about 60 percent.

The electrode body also probably contains a small amount of zinc oxide. It is believed that it is present inherently as a result of the interaction of zinc with certain minor amounts of oxygen. Apparently, the presence of such small amount of zinc oxide is not harmful, and may be helpful as a catalyst. Its presence in small quantities is not considered to be of substantial importance, either one way or the other, in an electrode in accordance with the present invention.

A typical electrode body, such as 21, consists of 50 percent nickel, 40 percent silver, and 10 percent zinc. This particular electrode composition is quite effective for molten carbonate fuel cells and represents a specific preferred composition.

The electrode body is highly porous. This is a result of the sintering process, discussed subsequently, and of the discrete particle sizes involved. Various particle sizes may be used; however, the particles should be small if a highly porous electrode body is to result. It is preferred that substantially all the particles, at least a major portion, have a size that will pass through a 150 mesh screen. On the other hand, it is preferred that a major portion of the particles have a particle size no smaller than about 10 microns. When the particles are too large, much active surface area is lost as a result of large pore size. When many of the particles are much below about 10 microns, the amount of surface coating oxide film inherently present becomes a significant part of the total particle. At above about 10 microns, it appears that effects of such oxides can substantially be ignored.

Typically, particle size of the metallic particles fused into an electrode body is the 325 mesh to 10 micron fraction. Electrode 21 will function quite efficiently when fabricated from particles of this size. This is preferred range of particle sizes for molten carbonate electrolyte systems.

Having discussed certain aspects of an electrode structure in accordance with the present invention, attention is now directed to FIGURE 2, which shows a cross section through a hypothetical electrode structure 41 which is schematically illustrative of certain aspects of the present invention. Spherical particles of zinc, silver, and nickel are clearly identified in the drawings by the respective chemical symbols applied centrally to the particles schematically illustrated.

The structure of FIGURE 2 indicates, in simplified and idealized form, the general nature of structure of an electrode in accordance with the present invention. The structure is better understood by briefly considering the process of this invention.

Small particles of silver, nickel, and zinc are blended and the resulting particle mass is sintered to produce a porous electrode. The sintering temperature is about 800° to 900° C. Since this is considerably above the melting point of pure zinc, it will be appreciated that the zinc becomes rather mobile within the sintering mass. It alloys with silver and with nickel and it would appear that complex alloys including zinc, silver, and nickel are also formed. Returning to FIGURE 2, the spherical shapes of the particles are, of course, merely illustrative. This is particularly true in the case of the zinc, which in fact is almost certain to have its particles rather drastically reshaped as a result of zinc's high mobility at the sintering temperature. However, the conceptual zinc particles serve to indicate that in those areas of intersection of zinc and adjacent silver particles (see intersection area 43, for example) and of zinc and adjacent nickel particles (see intersection area 45, for example), an alloy is formed between the zinc and silver and zinc and nickel, respectively. It will be observed that these alloy junctions act to hold the silver, nickel, and zinc mass together to support it as a coherent mass, but one having pore structure throughout (refer to pores 47, for example). Moreover, some junction structure forms between nickel and contiguous silver particles (refer, for example, to intersection area 49). It appears that the mobile zinc is to a degree alloyed with the components in nickel-silver junctions to permit relatively good sinter junctions therebetween. In some areas, the zinc clearly appears to enter adjacent nickel-silver structure to form complex alloys involving the three. For example, note the intersection area 51 on FIGURE 2.

It is not believed that the direct alloying of silver and nickel are particularly significant because of the low solubilities of these components, one within the other.

In summary, alloy connections between the components serve to unite the particles of silver, nickel, and zinc into a coherent, but porous mass, quite effective as an electrode for operation in most fuel cell systems, such as in FIGURE 1, for example, as either electrode 21 or 23.

The process of making an electrode body of the type illustrated in FIGURE 1 will now be described. Powders of silver, of nickel, and of zinc are thoroughly mixed together, as by mixing in a blender, to obtain a relatively uniform mixture. A porous or discontinuous layer of silver is applied to the magnesium oxide disk 17 of FIGURE 1 by flame spray technique, well known in the art. Thereafter, as is illustrated in FIGURE 3, a mild steel ring 61 is placed about the area to which the electrode body is to be joined. Then, the blended particle mix of silver, nickel and zinc is poured into ring 61 until a predetermined mass of particles 21' is obtained to yield a particular size electrode. The particle mixture is tamped down by means of a tamping plug 63, which may be made of mild steel. The tamping plug 63 is left in position to provide some weight from above upon the mass of particles.

The magnesium oxide disk 17 containing the particles, while evenly compacted within the ring under the tamping plug 63, is moved into a furnace which has an inert atmosphere, for example, argon, or by way of further example, nitrogen, helium and other inert gases. The particles are heated to a temperature of from about 800° C. to about 900° C., 850° being quite satisfactory. This temperature is maintained until sintering of the particles occurs so that they sinter together on contiguous surfaces into a coherent but porous mass. This normally takes a minimum of about 15 minutes, but the time can vary depending upon various conditions. As long as proper sintering temperature is held, a much longer time can safely be used, and it will be insured that proper sintering is obtained. It is preferred to sinter the particles for about one hour, or over.

While, as suggested previously, variations in lower and upper temperature limitations appear to generally lie within the range of somewhere in the neighborhood of 800° C. as a minimum, and somewhere in the vicinity of 900° C. as a maximum, it is nevertheless difficult to generalize on these values because variations in particle size and variations in percentages of the various components within limits contemplated herein have some effect upon the sintering operation. However, it does appear that at a temperature as low as 700° C., regardless of the zinc, silver, nickel system under consideration, within the scope hereof, inadequate sintering is obtained. Moreover, it appears that within the system contemplated, that at 1000° C. too much sintering is obtained. At this temperature the silver begins to ball-up, or agglomerate, into large particles, thus forming an inadequate sintered structure for a porous electrode.

After processing is concluded in accordance with the foregoing, the mass is permitted to cool and the magnesium oxide disk, bonded to the now sintered and coherent mass defining an electrode body, is removed from the oven. The resulting electrode, when operated with a suitable system, such as that described previously in connection with FIGURE 1, gives quite favorable results over sustained periods of operation. Catalytic activity is high, and structural integrity is maintained.

In many instances, it is desired that the extent of porosity within the electrode be increased from that which would be obtained by merely processing the discrete particles of silver, nickel and zinc in accordance with the foregoing. In such case, ammonium bicarbonate, or other appropriate "burn-out" agent, may be added in a desired amount in the form of a powder blended with the metal particles prior to sintering. During the heating process, the ammonium bicarbonate particles decompose into ammonia gas and carbon dioxide. The decomposing gas leaves pore structure in the electrode mass.

In some instances, lithium carbonate is added as a "burn-out" agent, either alone, or in combination with a certain quantity of another burn-out agent, such as ammonium bicarbonate. The lithium carbonate serves the additional function of lithiating the nickel, i.e., some atoms of lithium go into the nickel oxide structure (inherently present in a small quantity) and thus improve the electrical activity of the nickel oxide, and, hence, the nickel particles, on which the nickel oxide forms a film. Moreover, a small quantity of lithium carbonate provides some liquid phase sintering since a quantity of nickel dissolves in the lithium oxide and is thus made more mobile for sintering enhancement. When lithium carbonate is used, its particle sizes will be comparable to the size ranges for the metallic components, a preferred range for the lithium carbonate being somewhat narrower, from about 80–100 mesh.

An electrode body made in accordance with the present invention should have at least 5 percent by weight of nickel in order to give proper catalytic action to the final electrode. If over 60 percent by weight of nickel is used, on the other hand, improper sintering is obtained.

It has been further found that on the order of about 5 percent by weight of zinc is required to provide good sintering at the low temperatures of this process. This, apparently, is because of the alloying effect referred to previously in connection with the description of FIGURE 2. With less than about 5 percent by weight of zinc, the alloying does not occur to an extent sufficient to permit proper sintering of the particles into a coherent mass of desired characteristics. It is preferred that not in excess of 15 percent by weight of zinc be present because of the shortened life given the electrode by higher percentages. Moreover, the performance for a short period even is decreased.

No less than about 20 percent by weight of silver and no more than about 90 percent by weight should be used in an electrode in accordance with this invention. Preferred silver limits are from 30 percent to 60 percent by weight.

The present invention and the process for forming it are not limited to an electrode body of the type illustrated in FIGURE 1, wherein the body is joined to a magnesium oxide disk through a bond with a flame-sprayed layer of silver. An electrode of any desired shape, free of any bonding, can be produced by mixing the discrete particles of nickel, silver, and zinc, and then forming these particles into a desired "green" shape. With appropriate pressure, as applied by a press, for example, suitable green strength can be obtained for most desired shapes. The shaped green mass of particles is then placed on a suitable support, for example, on an impervious alumina plate within the inert atmosphere of an oven heated to the 800° C. to 900° C. temperature range. After processing for about 15 minutes, preferably for about one hour or more, the particle mass is removed. The particles are found to have sintered to produce a coherent, highly porous mass of the desired shape having high catalytic activity, good structural integrity, and durability under operation. Cylindrical, rectangular, and other varied shapes of electrodes can be made by the foregoing process.

The following examples are offered by way of further explanation of the practice of the process of this invention, and of electrodes of this invention. These examples are not to be taken as limiting, but merely as explanatory.

*Example 1*

Two and one-half grams of nickel, two grams of silver, and five-tenths gram of zinc, all in powdered form, with a particle size from about 325 mesh down to about 10 microns, are thoroughly mixed together, as in a blender. One-half gram of lithium carbonate powder, 80 to 150 mesh, is blended with the metal powders. After thorough blending, the powders are placed on a 3 3/16 inch magnesium oxide disk, in the manner illustrated in FIGURE 3 and described in connection therewith. The disk containing the powders is then placed within an oven having an argon atmosphere and allowed to remain at 900° C. temperature for about one hour. Thereafter, the powders are permitted to cool. On removal from the oven, a good electrode, coherent, yet porous, having high structural integrity and catalytic activity is obtained.

Example 2

Repetition of the foregoing example with the addition of seven-tenths gram of ammonium bicarbonate yields quite a satisfactory product. The pore structure is found to be somewhat improved as a result of the decomposition of ammonium bicarbonate during sintering.

Example 3

The procedure of Example 1 is repeated, except that the lithium carbonate is omitted. A satisfactory product is obtained; however, its characteristics are not quite so favorable as was the case of Example 1 when lithium carbonate is present. Nevertheless, the electrode is found to be quite acceptable.

Example 4

The procedure of Example 1 is repeated except the particles of blended powder are pressed into a rectangular electrode by means of a hydraulic press and complementary die. The resulting "green" shape has sufficient strength to support it for processing within a nitrogen atmosphere at 850° C. After one-half hour, the electrode is removed. A satisfactory electrode results, similar in characteristics to the electrode body of Example 1.

Example 5

The procedure of Example 1 is repeated except with 30 percent by weight of nickel, 60 percent by weight of silver, and 10 percent by weight of zinc. Moreover, the particles were in the 150 mesh to 325 mesh particle size range instead of the range of Example 1. Quite a satisfactory electrode product is obtained.

Example 6

Repetition of Example 5, but without lithium carbonate, produces a satisfactory product, though the lithium carbonate processed item is preferred for many purposes.

Example 7

Repetition of Example 5, but with ammonium carbonate present, is found to produce a product having an increased porosity, preferable for many operations.

Example 8

The process of Example 3 is repeated, but with 60 percent by weight of nickel, 30 percent by weight of silver and 10 percent by weight of zinc. A satisfactory electrode product results.

Example 9

The procedure of the Example 8 is repeated, except 35 percent by weight of silver, 60 percent by weight of nickel and 5 percent by weight of zinc are employed. The end product is considered satisfactory, but drop in catalytic activity is noted.

Example 10

The foregoing example is repeated, except 35 percent by weight of silver, 50 percent by weight of nickel and 15 percent by weight of zinc is utilized. The end product is found to constitute a satisfactory electrode, although some increased tendency toward shorter life of operation is noted.

It has been found that corrosion resistance of the electrode of this invention may be increased somewhat by using an alloy of nickel with a refractory metal such as molybdenum in place of the pure nickel. It is important, of course, that the refractory metal not interfere with the synergetic effect of the constituents (the silver, nickel and zinc) cooperating to give the instant invention superior characteristics. Such a noninterfering refractory metal is molybdenum. An electrode in which the amount of nickel is replaced by a nickel-molybdenum alloy having a ratio of 4 to 1 is found to be quite satisfactory. Essentially the only change characteristics noted in such an electrode is the increased life resulting from corrosion resistance.

Example 11

The procedure of Example 3 is repeated, except the nickel powder is replaced by a fine powder of the same general size characteristics, constituting an alloy of nickel and molybdenum, of 4 to 1 ratio. The end product is found to be quite a satisfactory electrode, comparable to the electrode of Example 3, but having increased corrosion resistance.

It will be appreciated that the various additives or components having burn-out, corrosion resistant, or other favorable characteristics, might be added to the principal constituents of the instant invention, usually, however, in relatively minor proportion. Nevertheless, it will be appreciated that the success of the electrode of this invention is dependent upon the combination of the metallic constituents, i.e., nickel, silver and zinc, and, accordingly, it is seen that, effectively, an electrode consists essentially of these components when made in accordance with this invention.

It is seen that a porous metal electrode of silver, nickel, and zinc, including a method of making same, has been provided which meets the objectives set out hereinabove. Such electrode comprises a matrix of particles of silver, of nickel, and of zinc. The particles are seen to be sintered together by interconnecting alloy structure, comprising alloys of zinc with the other two metals.

The screen sizes referred to herein are American Standard Screen Sizes, i.e., the Tyler scale adopted by the U.S. Bureau of Standards.

Particle size is to be taken as the limiting dimension on a particle controlling its passage through a screen or aperture of the size stated.

Having described the invention in connection with certain specific embodiments thereof, it is to be understood that further modifications may now suggest themselves to those skilled in the art and it is intended to cover such modifications as fall within the scope of the appended claims.

What is claimed is:

1. In combination with a fuel cell, a porous electrode consisting essentially of a commingled multiplicity of particles of silver, of nickel, and of zinc, sintered together in interconnecting structure comprising alloys of the metals of said particles, said silver particles being present in an amount from about 20 percent by weight to about 90 percent by weight, said nickel particles being present in amount from about 5 percent by weight to about 60 percent by weight, and said zinc particles being present in amount from about 5 percent by weight to about 15 percent by weight, said percentages by weight being based on the total weight of silver, nickel, and zinc particles.

2. In combination with a fuel cell, the porous electrode of claim 1 wherein said silver particles are present in amount of from about 30 percent by weight to about 60 percent by weight.

3. In combination with a fuel cell, the porous electrode of claim 1 wherein said interconnecting structure comprising alloys of the metals of said particles comprises an alloy of zinc and silver, an alloy of zinc and nickel, and ternary alloys of zinc, nickel and silver.

4. In combination with a fuel cell, the porous electrode of claim 1 having a small amount of lithium oxide therein.

References Cited

UNITED STATES PATENTS

| | | | |
|---|---|---|---|
| 1,988,861 | 1/1935 | Thorausch et al. | 75—222 |
| 3,167,457 | 1/1965 | Bacon et al. | 136—120 |

(Other references on following page)

UNITED STATES PATENTS

| | | | |
|---|---|---|---|
| 2,159,763 | 5/1939 | Hensel | 75—200 |
| 2,677,006 | 4/1954 | Ameln | 136—28 |
| 2,700,062 | 1/1955 | Schlecht et al. | 136—29 |
| 2,901,523 | 8/1959 | Justi et al. | 136—86 |
| 3,020,327 | 2/1962 | Ruetschi | 136—120 |
| 3,040,115 | 6/1962 | Moos | 136—120 |
| 3,062,909 | 11/1962 | Reutschi | 136—86 |

FOREIGN PATENTS

| | | |
|---|---|---|
| 935,430 | 8/1963 | Great Britain. |
| 939,238 | 10/1963 | Great Britain. |

ALLEN B. CURTIS, *Primary Examiner.*

WINSTON A. DOUGLAS, *Examiner.*

A. SKAPARS, *Assistant Examiner.*